(12) United States Patent
Owens et al.

(10) Patent No.: US 10,530,642 B1
(45) Date of Patent: Jan. 7, 2020

(54) REMOTE CONFIGURATION OF A MACHINE

(71) Applicant: Palantir Technologies Inc., Palo Alto, CA (US)

(72) Inventors: Kyle Owens, San Francisco, CA (US); Daniel Berkowitz, New York, NY (US); Samuel Bond, Arlington, VA (US)

(73) Assignee: Palantir Technologies Inc., Palo Alto, CA (US)

( * ) Notice: Subject to any disclaimer, the term of this patent is extended or adjusted under 35 U.S.C. 154(b) by 288 days.

(21) Appl. No.: 15/660,707

(22) Filed: Jul. 26, 2017

Related U.S. Application Data (60) Provisional application No. 62/516,517, filed on Jun. 7, 2017.

(51) Int. Cl.
| | | |
|---|---|---|
| *G06F 15/177* | (2006.01) | |
| *H04L 12/24* | (2006.01) | |
| *H04L 29/08* | (2006.01) | |
| *G06F 1/24* | (2006.01) | |
| *G06F 9/445* | (2018.01) | |

(52) U.S. Cl.
CPC .......... *H04L 41/0803* (2013.01); *H04L 67/34* (2013.01); *G06F 1/24* (2013.01); *G06F 9/44505* (2013.01)

(58) Field of Classification Search
CPC ............. G06F 9/45558; G06F 9/45533; G06F 2009/4557; G06F 9/45595; G06F 9/45562
See application file for complete search history.

(56) References Cited

U.S. PATENT DOCUMENTS

| | | | |
|---|---|---|---|
| 5,568,390 | A | 10/1996 | Hirota et al. |
| 5,857,329 | A | 1/1999 | Bigham |
| 5,902,349 | A | 5/1999 | Endo et al. |
| 6,496,774 | B1 | 12/2002 | Davies |

(Continued)

FOREIGN PATENT DOCUMENTS

| | | |
|---|---|---|
| EP | 0652513 A1 | 5/1995 |
| EP | 1926074 A1 | 5/2008 |

(Continued)

OTHER PUBLICATIONS

"U.S. Appl. No. 13/196,788, Examiner Interview Summary dated Nov. 25, 2015", 7 pgs.

(Continued)

*Primary Examiner* — Brian Whipple
*Assistant Examiner* — Gregory P Tolchinsky
(74) *Attorney, Agent, or Firm* — Schwegman Lundberg & Woessner, P.A.

(57) ABSTRACT

Aspects of the present disclosure relate to remote configuration of a computing machine. A deployment server receives a request specifying a software configuration and a hardware configuration for a computing machine. The deployment server identifies, out of a plurality of computing machines available for deployment, a specific computing machine meeting the hardware configuration. The deployment server configures the specific computing machine based on the software configuration. The deployment server provides an output indicating that the specific computing machine is configured according to the request.

17 Claims, 8 Drawing Sheets

(56) References Cited

U.S. PATENT DOCUMENTS

| | | |
|---|---|---|
| 6,608,559 B1 | 8/2003 | Lemelson et al. |
| 7,603,229 B2 | 10/2009 | Goldberg et al. |
| 7,818,291 B2 | 10/2010 | Ferguson et al. |
| 7,941,321 B2 | 5/2011 | Greenstein et al. |
| 8,042,110 B1 | 10/2011 | Kawahara et al. |
| 8,046,283 B2 | 10/2011 | Burns et al. |
| 8,108,138 B2 | 1/2012 | Bruce et al. |
| 8,352,174 B2 | 1/2013 | Milstein et al. |
| 8,417,409 B2 | 4/2013 | Bast et al. |
| 8,763,078 B1 | 6/2014 | Castellucci et al. |
| 8,786,605 B1 | 7/2014 | Curtis et al. |
| 9,092,482 B2 | 7/2015 | Harris et al. |
| 9,280,532 B2 | 3/2016 | Cicerone et al. |
| 2004/0153418 A1 | 8/2004 | Hanweck |
| 2006/0241856 A1 | 10/2006 | Cobleigh et al. |
| 2007/0088596 A1 | 4/2007 | Berkelhamer et al. |
| 2007/0198571 A1 | 8/2007 | Ferguson et al. |
| 2007/0220604 A1 | 9/2007 | Long |
| 2008/0301559 A1 | 12/2008 | Martinsen et al. |
| 2008/0313281 A1 | 12/2008 | Scheidl et al. |
| 2009/0037912 A1 | 2/2009 | Stoitsev et al. |
| 2009/0319418 A1 | 12/2009 | Herz |
| 2010/0162371 A1 | 6/2010 | Geil |
| 2010/0205662 A1 | 8/2010 | Ibrahim et al. |
| 2011/0041084 A1 | 2/2011 | Karam |
| 2011/0153592 A1 | 6/2011 | DeMarcken |
| 2011/0185401 A1 | 7/2011 | Bak et al. |
| 2012/0101952 A1 | 4/2012 | Raleigh et al. |
| 2012/0290506 A1 | 11/2012 | Muramatsu et al. |
| 2013/0036346 A1 | 2/2013 | Cicerone |
| 2013/0111468 A1* | 5/2013 | Davis .................. G06F 9/5077 718/1 |
| 2013/0231862 A1 | 9/2013 | Delling et al. |
| 2013/0286601 A1 | 10/2013 | Shin et al. |
| 2014/0081685 A1 | 3/2014 | Thacker et al. |
| 2014/0181833 A1 | 6/2014 | Bird et al. |
| 2015/0120176 A1 | 4/2015 | Curtis et al. |
| 2015/0261817 A1 | 9/2015 | Harris et al. |
| 2016/0147730 A1 | 5/2016 | Cicerone |
| 2016/0337445 A1* | 11/2016 | Kono ........................ G06F 8/61 |

FOREIGN PATENT DOCUMENTS

| | | |
|---|---|---|
| EP | 2555126 A2 | 2/2013 |
| EP | 2876587 A1 | 5/2015 |
| WO | WO-2012025915 A1 | 3/2012 |

OTHER PUBLICATIONS

"U.S. Appl. No. 13/196,788, Non Final Office Action dated Oct. 23, 2015", 20 pgs.

"U.S. Appl. No. 13/196,788, Notice of Allowance dated Dec. 18, 2015", 17 pgs.

"U.S. Appl. No. 13/657,656, Final Office Action dated May 6, 2015", 29 pgs.

"U.S. Appl. No. 13/826,228, Notice of Allowance dated Mar. 27, 2015", 10 pgs.

"U.S. Appl. No. 14/196,814, Non Final Office Action dated May 5, 2015", 24 pgs.

"U.S. Appl. No. 14/302,279, Non Final Office Action dated Sep. 24, 2015", 10 pgs.

"U.S. Appl. No. 14/302,279, Notice of Allowance dated Apr. 5, 2016", 17 pgs.

"U.S. Appl. No. 14/726,211, Non Final Office Action dated Apr. 5, 2016", 15 pgs.

"Canadian Application Serial No. 2,846,414, Office Action dated Apr. 13, 2016", 5 pgs.

"European Application Serial No. 14162372.8, Extended Search Report dated Apr. 30, 2015", 7 pgs.

"German Application Serial No. 102013221052.3, Office Action dated Mar. 24, 2015", w/English Translation, 17 pgs.

"German Application Serial No. 102013221057.4, Office Action dated Mar. 23, 2015", w/ English Translation, 17 pgs.

"Help File for ModelRisk Version 5—Part 1", Vose Software, (2007), 375 pgs.

"Help File for ModelRisk Version 5—Part 2", Vose Software, (2007), 362 pgs.

"Netherlands Application Serial No. 2012436, Search Report dated Nov. 6, 2015", w/ English Translation, 8 pgs.

"New Zealand Application Serial No. 623323, First Examination Report dated Apr. 17, 2014", 2 pgs.

"New Zealand Application Serial No. 623323, Further Examination Report dated Jun. 6, 2014", 2 pgs.

Ashraf, "Protect your Google Account (Gmail) by enabling SMS (text message) notifications for Suspicious Activity", online article from dotTech, Jan. 24, 2013, https://dottech.org/94405/how-to-setup-text-message-sms-google-notifications-for-suspicious-activity/, (Jan. 24, 2013), 4 pgs.

Ballesteros, Francisco, et al., "Batching: A Design Pattern for Efficient and Flexible Client/Server Interaction", Transaction on Pattern Language of Programming I, (c) Springer-Verlag Berlin Heidelberg 2009, (2009), 48-66.

Bogle, Phillip, et al., "Reducing Cross-Domain Call Overhead Using Batched Futures", SIGPLAN No. 29, 10, OOPSLA ' 94, (Oct. 1994), 341-354.

Chen, Chia-Ying, et al., "A Novel Emergency Vehicle Dispatching System", 2013 IEEE 77th Vehicular Technology Conference, IEEE, (Jun. 2, 2013), 5 pgs.

Eklund, Peter W., et al., "A Dynamic Multi-source Dijkstra's Algorithm for Vehicle Routing", Intelligent Information Systems, (1996), 5 pgs.

Hart, Peter E., et al., "A Formal Basis for the Heuristic Determination of Minimum Cost Paths", IEEE Transactions on Systems Science and Cybernetics, IEEE, vol. 1, No. 2, (Jul. 1968), 100-107.

Jotshi, Arun, et al., "Dispatching and Routing of Emergency Vehicles in Disaster Mitigation Using Data Fusion", Socio-Economic Planning Sciences, Pergamon, Amsterdam, Netherlands, vol. 43, No. 1, (Mar. 1, 2009), 24 pgs.

Mohring, Rolf H., "Partitioning Graphs to Speedup Dijkstra's Algorithm", ACM Journal of Experimental Algorithmics, Association of Computing Machinery, New York, New York, vol. 11, (Jan. 1, 2006), 29 pgs.

Reedy, Sarah, "Policy and Charging Rules Function (PCRF)", http://www.lightreading.com/document.asp?doc_id=680015 printed Dec. 10, 2013, (Sep. 13, 2010), 4 pgs.

Stamos, James, et al., "Remote Evaluation", ACM Transactions on Programming Languages and Systems, vol. 12, No. 4, (Oct. 1990), 537-565.

Wagner, Dorothea, et al., "Dynamic Shortest Paths Containers", Electronic Notes in Theoretical Computer Science, vol. 92, No. 1, (2003), 19 pgs.

Yang, Shu, "An Enhanced Routing Method with Dijkstra Algorithm and AHP Analysis in Gis-based Emergency Plan", Geoinformatics, 2010 18th International Conference on, IEEE, Piscataway, New Jersey, (Jun. 18, 2010), 6 pgs.

\* cited by examiner

PURCHASE ORDERS ORDERED

Add New Purchase Order

Search by ticket number or SN....

| View Info | Ticket Number | Item Ordered | Vendor | DoD | Notes | Shipped? | |
|---|---|---|---|---|---|---|---|
| View Info | A-1 | A x XYA ABC (X-core Standard) | XYA | Yes | Xx X-core servers for rainy day - ABC; XYZ | Shipped? | Edit |
| View Info | A-2 | B x XYA ABC (Y-core Standard) | XYA | Yes | DEF for rainy day; FGH | Shipped? | Edit |
| View Info | A-3 | C x DEF ABCMHz FGH | XYAB | No | | Shipped? | Edit |
| View Info | A-4 | D x GFI NOP X point rack mount kit | XYAB | No | | Shipped? | Edit |
| View Info | A-5 | E x GHI LL Small,Small | XYA | Yes | | Shipped? | Edit |
| View Info | A-6 | F x GHI LL Small,Large | XYA | Yes | | Shipped? | Edit |
| View Info | A-7 | G x GHI NOP Small,Huge | XYA | Yes | | Shipped? | Edit |
| View Info | A-8 | H x GHI NOP Small,Large | XYA | Yes | | Shipped? | Edit |
| View Info | A-9 | I x GHI NOP Small,Large | XYA | Yes | | Shipped? | Edit |
| View Info | A-10 | J x GHI LL Small,Large | XYA | Yes | | Shipped? | Edit |
| View Info | A-11 | K x ABC Storage | XYA | Yes | | Shipped? | Edit |
| View Info | A-12 | L x GHI NOP Small,Large | XYA | Yes | | Shipped? | Edit |
| View Info | A-13 | M x GHI NOP Small,Huge | XYA | Yes | | Shipped? | Edit |
| View Info | A-14 | N x GHI LL Small,Large | XYA | Yes | | Shipped? | Edit |
| View Info | A-15 | O x GHI NOP Small,Huge | XYA | Yes | | Shipped? | Edit |
| View Info | A-16 | P x XTB HDD XGbps | XYA | No | Additional XTB HDDs for backfill at CDE; LMNO | Shipped? | Edit |
| View Info | A-17 | Q x XYA XYZ Forward (XGB variant) | XYA | No | for CDE, approved by FGH. OPQR | Shipped? | Edit |
| View Info | A-18 | R x ZAB TUV XTB SSD | XYAB | No | | Shipped? | Edit |

YANKEES

A-123

QUOTE REQUEST
Prepared For
POC
POC Email          abc@example.com
As Of              Thursday, November 3, 2016
Expires            Saturday, December 3, 2016
Total Quote Cost   $XYZ USD Search by ticket number or SN....

| Servers | Other Hardware |

SHOW QUOTE

ADD SERVERS

1 Storage
Yankees ABC Storage
X-core ZAB EFGH
XGB XGB XXYYMTs DDRx LM
Xx XTB HDD
$XYZ

5 Database
Yankees ABC LL
X-core ZAB EFGH
XGB XGB XXYYMTs DDRx LM
Xx ZAB TUVW X TB SSD
$XYZ

17 Application
Yankees GHI NOP
X-core ZAB EFGHWv4
XGB XGB XXYYMTs DDRx LM
Xx ZAB TUVW X GB SSD
$XYZ

3 Application
Yankees GHI Utility
X-core ZAB EFGHWv4
XGB XGB XXYYMTs DDRx LM
Xx ZAB TUVW X TB SSD
$XYZ PREPARED FOR:
POC:
QUOTE PREPARED: NOVEMBER 3, 2016
QUOTE VALID THROUGH: DECEMBER 3, 2016

HARDWARE:

| Part Number | Description | Qty | Unit Price | Total |
|---|---|---|---|---|
| ABC | Storage: OEM LMN ABC with X-year support | X | $XYZ | $XYZ |
| | X-Core (X x ZAB EFGH CPU) with XGB RAM | | | |
| | X x XTB HDD | | | |
| ABC | Database: OEM LMN ABC with X-year support | X | $XYZ | $XYZ |
| | X-Core (X x ZAB EFGH CPU) with XGB RAM | | | |
| | X x ZAB TUVW X TB SSD | | | |
| GHI | Application: OEM LMN GHI With X-year support | X | $XYZ | $XYZ |
| | X-Core (X x ZAB EFGHWv4 CPU) with XGB RAM | | | |
| | X x ZAB TUVW XGB SSD | | | |
| GHI | Application: OEM LMN GHI with X-year support | X | $XYZ | $XYZ |
| | X-Core (X x ZAB EFGHWv4 CPU) with XGB RAM | | | |
| | X x ZAB TUVW X TB SSD | | | |
| MNO-CDEFUP-FA | DEF GHIUP XRU X-port Switch w/ XxXG Modules, Redundant PSU, Front-to-Back Airflow | X | $XYZ | $XYZ |
| MNO-CDEFTP-E | DEF GHPXXTP-E X-port Switch | X | $XYZ | $XYZ |
| PQR- XG-SR= | DEF SR Transceiver - XGBASE-SR SFP Module | X | $XYZ | $XYZ |
| EFGHFPSR | ZAB SR Transceiver - ZAB Ethernet SFP SR Optic - X x XGBase-SR MODULE XGB | X | $XYZ | $XYZ |
| ARDEF | JKL ARDPOQ X IJK QRS Server Rack Drawer | X | $XYZ | $XYZ |

TOTAL COST: $XYZ

FIG. 4C

HARDWARE REQUESTS

PLANNING

| | Ticket Number | Deployment | Due Date | Build Profile | Requestor |
|---|---|---|---|---|---|
| View Request | A-21 | XY | Wednesday, March 1, 2017 | JK LM POW XR Stg 2 | abc@example.com |

OPEN

| | Ticket Number | Deployment | Hardware | Build Status | Install Status | Blocking Status | Due Date |
|---|---|---|---|---|---|---|---|
| View Request | A-22 | AB | E:X F:X G:X H:X I:X J:X | BUILT | INSTALLED | NOT BLOCKING | Jan 1, 1111 |
| View Request | A-23 | CD | E:X F:X G:X H:X I:X J:X | BUILT | INSTALLED | NOT BLOCKING | Nov 11, 1111 |
| View Request | A-24 | EF | E:X F:X G:X H:X I:X J:X | BUILDING... | READY | NOT BLOCKING | Jan 1, 2001 |
| View Request | A-25 | GH | E:X F:X G:X H:X I:X J:X | BUILDING... | READY | NOT BLOCKING | Jan 1, 2001 |
| View Request | A-26 | IJ | E:X F:X G:X H:X I:X J:X | BUILT | N/A | NOT BLOCKING | Jan 31, 2017 |
| View Request | A-27 | KL | E:X F:X G:X H:X I:X J:X | BUILT | N/A | NOT BLOCKING | Jan 31, 2017 |
| View Request | A-28 | MN | E:X F:X G:X H:X I:X J:X | BUILT | N/A | NOT BLOCKING | Jan 31, 2017 |
| View Request | A-29 | OP | E:X F:X G:X H:X I:X J:X | NOT READY | N/A | NOT BLOCKING | Feb 10, 2017 |
| View Request | A-30 | QR | E:X F:X G:X H:X I:X J:X | BUILDING... | N/A | NOT BLOCKING | Feb 10, 2017 |
| View Request | A-31 | ST | E:X F:X G:X H:X I:X J:X | NOT READY | N/A | NOT BLOCKING | Feb 16, 2017 |
| View Request | A-32 | | E:X F:X G:X H:X I:X J:X | NOT READY | N/A | NOT BLOCKING | Feb 17, 2017 |

SHIPPED

| | Ticket Number | Deployment | Date Shipped | Tracking | Manifest | Received? |
|---|---|---|---|---|---|---|
| View Request | A-33 | UV | Tuesday, January 10, 2017 | XYZAB | MANIFEST | RECEIVED? |
| View Request | A-34 | WX | Monday, January 23, 2017 | XYZAB | MANIFEST | RECEIVED? |
| View Request | A-35 | YZ | Thursday, February 2, 2017 | XYZAB | MANIFEST | RECEIVED? |
| View Request | A-36 | AA | Friday, February 3, 2017 | | MANIFEST | RECEIVED? |

Add New Hardware Request

REMOTE CONFIGURATION OF A MACHINE

PRIORITY APPLICATION

This application claims priority to U.S. Provisional Application Ser. No. 62/516,517, filed Jun. 7, 2017, the disclosure of which is incorporated herein in its entirety by reference.

TECHNICAL FIELD

The subject matter disclosed herein relates to configuration of a machine. In particular, example embodiments may relate to remote configuration of a machine by a deployment server.

BACKGROUND

Typically, when a user receives a computing machine (e.g. a server) the user configures software on the machine after the machine is shipped to the user. However, in some cases, configuring the software on the machine may be difficult, for example, if the machine is kept in a remote location with poor network connectivity. As the foregoing illustrates, new techniques for configuring a computing machine may be desirable.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

According to some aspects, a vendor/provider of computing machines stores multiple computing machines that are available for deployment. The computing machines that are available for deployment are connected to a deployment server. The deployment server receives, over a network and from an end-user, a request specifying a software configuration and a hardware configuration for a computing machine requested by the end-user. The hardware configuration indicates one or more of a processor requirement, a memory requirement, and a network interface requirement for the computing machine. The software configuration indicates an operating system and/or a software program for the computing machine.

The deployment server identifies, out of the computing machines that are available for deployment, a specific computing machine meeting the hardware configuration. The specific computing machine is selected for the end-user. The deployment server configures (e.g. adds software to) the specific computing machine based on the software configuration. The deployment server provides (e.g. to an employee of the vendor) an output indicating that the specific computing machine is configured according to the purchase request.

Some aspects of the subject technology relate to inventory management and remote configuration of hardware in response to a user requisition (e.g., a user request, such as a purchase order). Some aspects are directed to a complete inventory management system, which tracks computing machines that are available for deployment and is able to provide output describing the availability of such machines.

Figure 1:
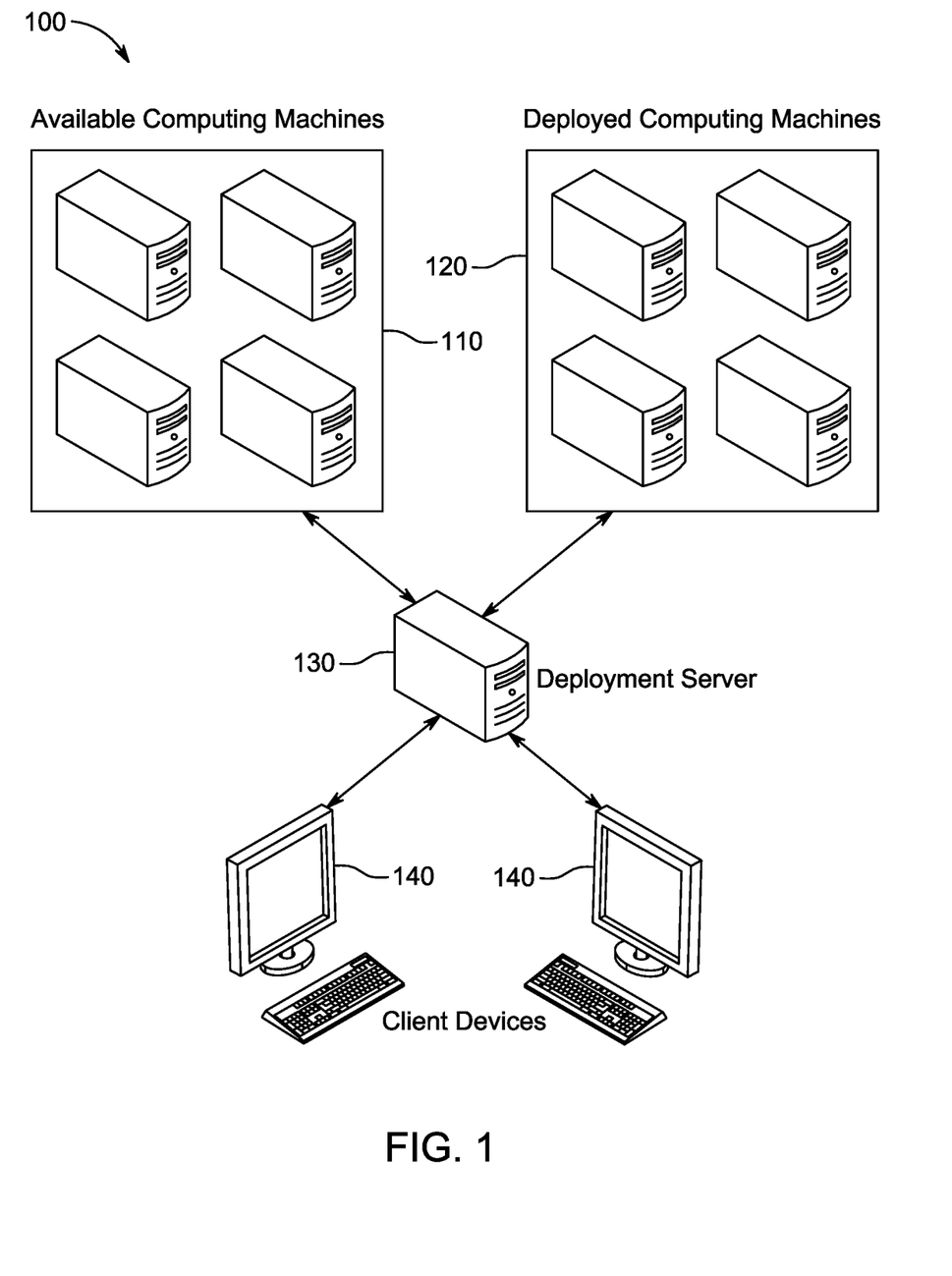
FIG. 1 is a block diagram of an example system in which remote configuration of a machine may be implemented, according to some embodiments.

FIG. 1 is a block diagram of an example system 100 in which remote configuration of a machine may be implemented, according to some embodiments. As shown, the system 100 includes available computing machines 110, deployed computing machines 120, a deployment server 130, and client devices 140. The available computing machines 110 include computing machines which are available for deployment (e.g., when requested by a customer). The deployed computing machines 120 are machines that are deployed for use by end-users (e.g., customers). When a machine from among the available computing machines 110 is deployed, it becomes one of the deployed computing machines 120. To be deployed, a machine may be verified to have the hardware requested for the deployment, and requested software requested for the deployment may be added to the machine. The client devices 140 allow users (e.g., administrators) to communicate with the deployment server 130 over a network (e.g., the Internet). The deployment server 130 tracks the available computing machines 110 and the deployed computing machines 120. The deployment server 130 remotely configures one or more of the available computing machines for deployment. More details of the operation of the deployment server are discussed below in conjunction with FIG. 2.

Figure 2:
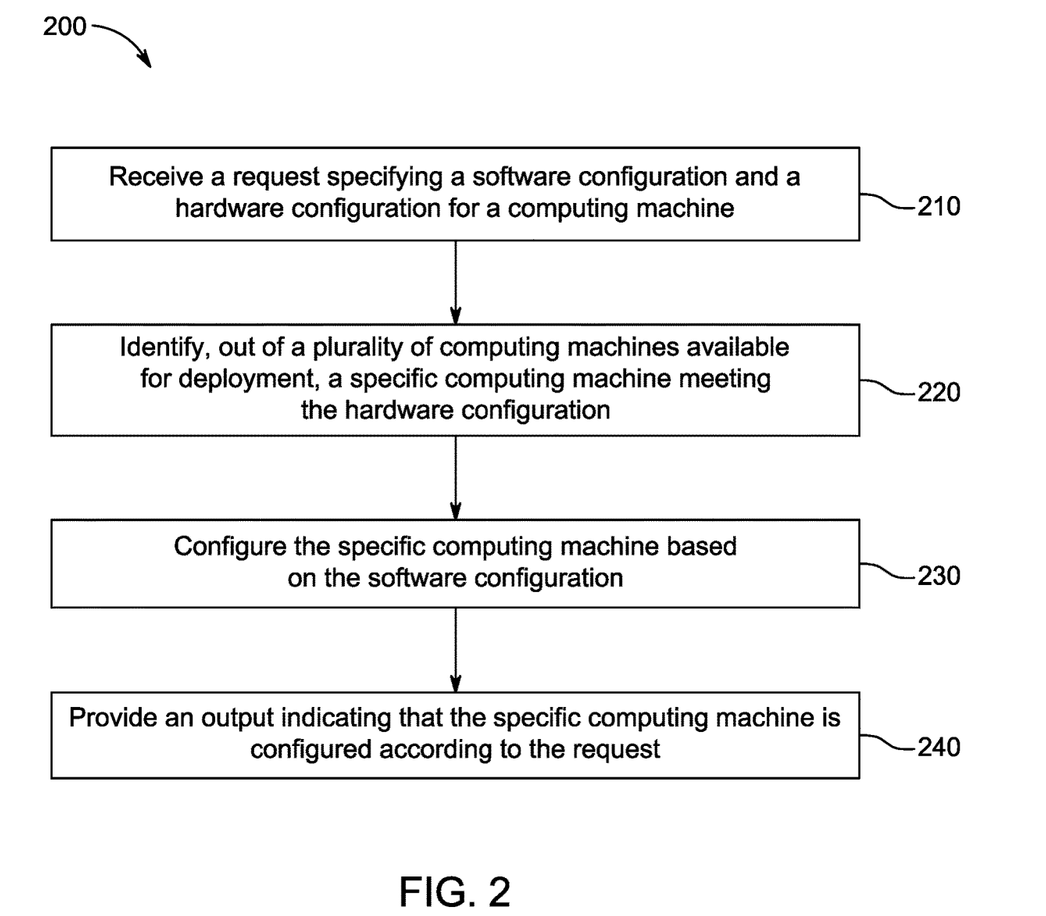
FIG. 2 is a flow chart illustrating an example method for remote configuration of a machine, according to some embodiments.

FIG. 2 is a flow chart illustrating an example method 200 for remote configuration of a machine, according to some embodiments. The method 200 may be implemented at the deployment server 130 within the system 200, and is described herein as being implemented at the deployment server 130. However, in alternative embodiments, the method 200 may be implemented at other machine(s) or within other system(s). The method 200 is not limited to being implemented at the deployment server 130 as described herein.

At operation 210, the deployment server 130 receives (e.g., within a purchase order and from a customer or administrator operating the client device 140) a request specifying a software configuration and a hardware configuration for a computing machine. In some cases, the software configuration indicates an operating system or a software program for the computing machine. The hardware configuration indicates one or more of a processor requirement, a memory requirement, and a network interface requirement for the computing machine.

At operation 220, the deployment server 130 identifies, out of a plurality of the available computing machines 110 (which are available for deployment), a specific computing machine meeting the hardware configuration. In some examples, the deployment server 130 stores (e.g., in a local memory or a data repository coupled to the deployment server 130) a first data structure representing the available computing machines 110, which are available for deployment, and a second data structure representing the already deployed computing machines 120. Either the first data structure or the second structure may be a table, a hash table, a list, an array, a matrix, and the like. Either the first data structure or the second data structure stores representations of the hardware and the software at each computing machine. The first data structure is used to track the plurality of available computing machines 110. The second data structure is used to track the deployed computing machines 120.

At operation 230, the deployment server 130 configures, remotely over a network, the specific computing machine based on the software configuration. The deployment server 130 may remotely install software on the specific computing machine. In some examples, the deployment server 130 transmits the software configuration to the specific computing machine via a network. The first data structure (e.g., representing the available computing machines 110) and the second data structure (e.g., representing the deployed computing machines 120) may be updated based on the specific computing machine being configured according to the request. For example, when the specific computing machine is deployed, a representation of the specific computing machine may be moved from the first data structure to the second data structure.

At operation 240, the deployment server 130 provides (e.g., to the client device 140) an output indicating that the specific computing machine is configured according to the request. In some cases, a client device 140 may issue a second request for a listing of the available computing machines 110, which are available for deployment. The deployment server 130 may provide, in response to the issued second request, a representation of the first data structure for display at the client device 140. The displayed data at the client device 140 may indicate the hardware and software residing at each of the available computing devices 110. In some cases, a client device 140 may issue a third request for a listing of the deployed computing machines 120, which have already been deployed. The deployment server 130 may provide, in response to the issued third request, a representation of the second data structure for display at the client device 140. The displayed data at the client device 140 may indicate the hardware and software residing at each of the deployed computing devices 120.

The first data structure and the second data structure may be copied to a client device and may be searched or manipulated at the client device. For example, the first data structure may be used to determine that inventory of machine(s) with certain hardware is low, and that new machines having the hardware are to be ordered or manufactured. The second data structure may be used to determine which machines are being deployed. For example, if machines with Hardware A are being deployed, while machines with competing Hardware B are available but not being deployed, the supply of Hardware A may be increased or steps may be taken to increase the demand or reduce the supply of Hardware B.

Figure 3:
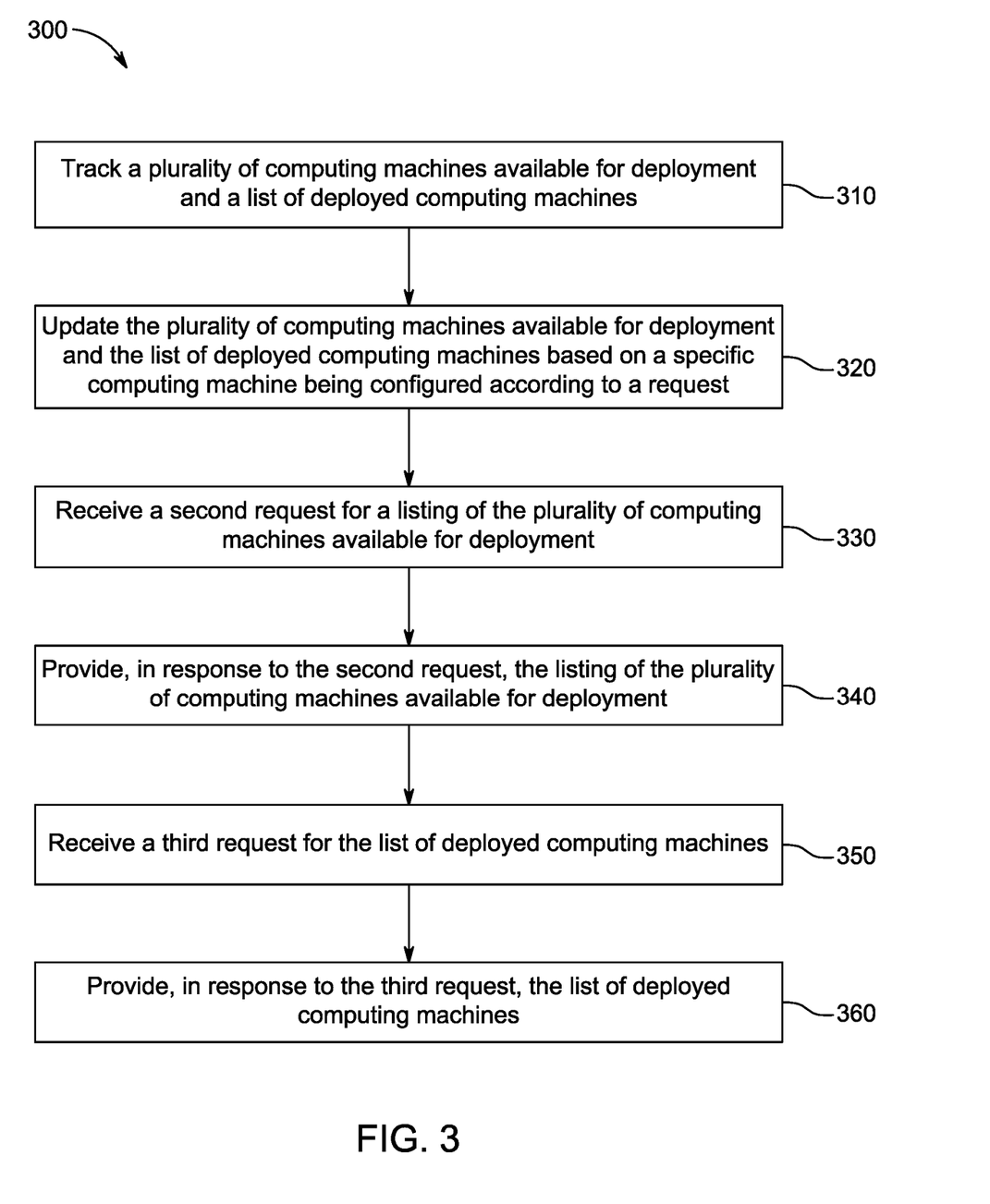
FIG. 3 is a flow chart illustrating an example method for tracking machines, according to some embodiments.

FIG. 3 is a flow chart illustrating an example method 300 for tracking machines, according to some embodiments. The method 300 may be implemented at the deployment server 130 within the system 300, and is described herein as being implemented at the deployment server 130. However, in alternative embodiments, the method 300 may be implemented at other machine(s) or within other system(s). The method 300 is not limited to being implemented at the deployment server 130 as described herein. The method 300 may be implemented in conjunction with the method 200.

At operation 310, the deployment server 130 tracks a plurality of computing machines available for deployment (e.g., available computing machines 110) and a list of deployed computing machines (e.g., deployed computing machines 120).

At operation 320, the deployment server 130 updates the plurality of computing machines available for deployment and the deployed computing machines based on a specific computing machine being configured according to a request (e.g., as in operation 230 of the method 200).

At operation 330, the deployment server 130 receives (e.g., from a client device 140) a second request for a listing of the plurality of computing machines available for deployment.

At operation 340, the deployment server 130 provides, in response to the second request, the listing of the plurality of computing machines available for deployment. The listing identifies hardware and software available at each of the plurality of computing machines.

At operation 350, the deployment server receives a third request for the list of deployed computing machines.

At operation 360, the deployment server 130 provides, in response to the third request, the list of deployed computing machines.

Figure 4A:
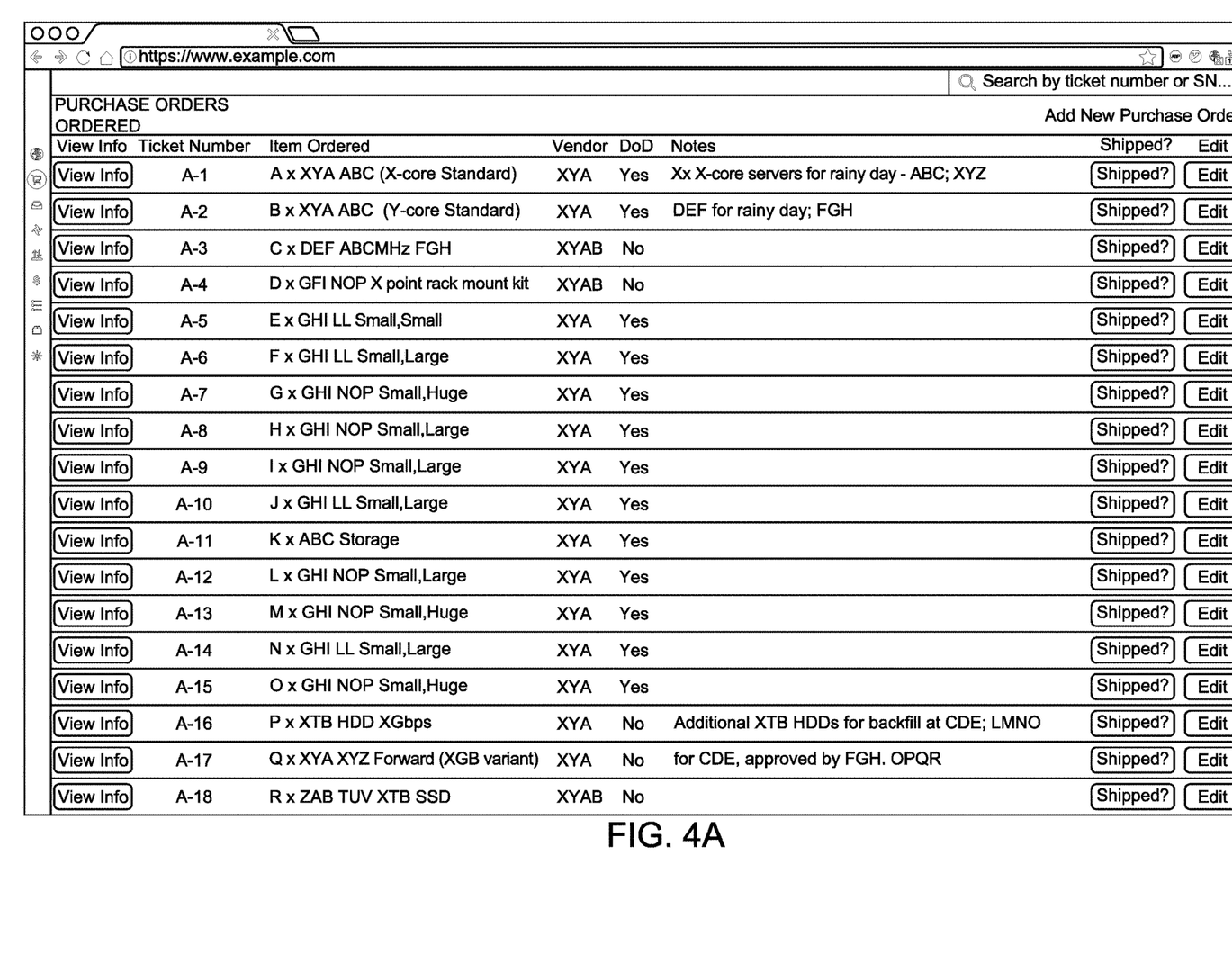
FIG. 4A illustrates an example of purchase orders for computing machines, according to some embodiments.
Figure 4B:
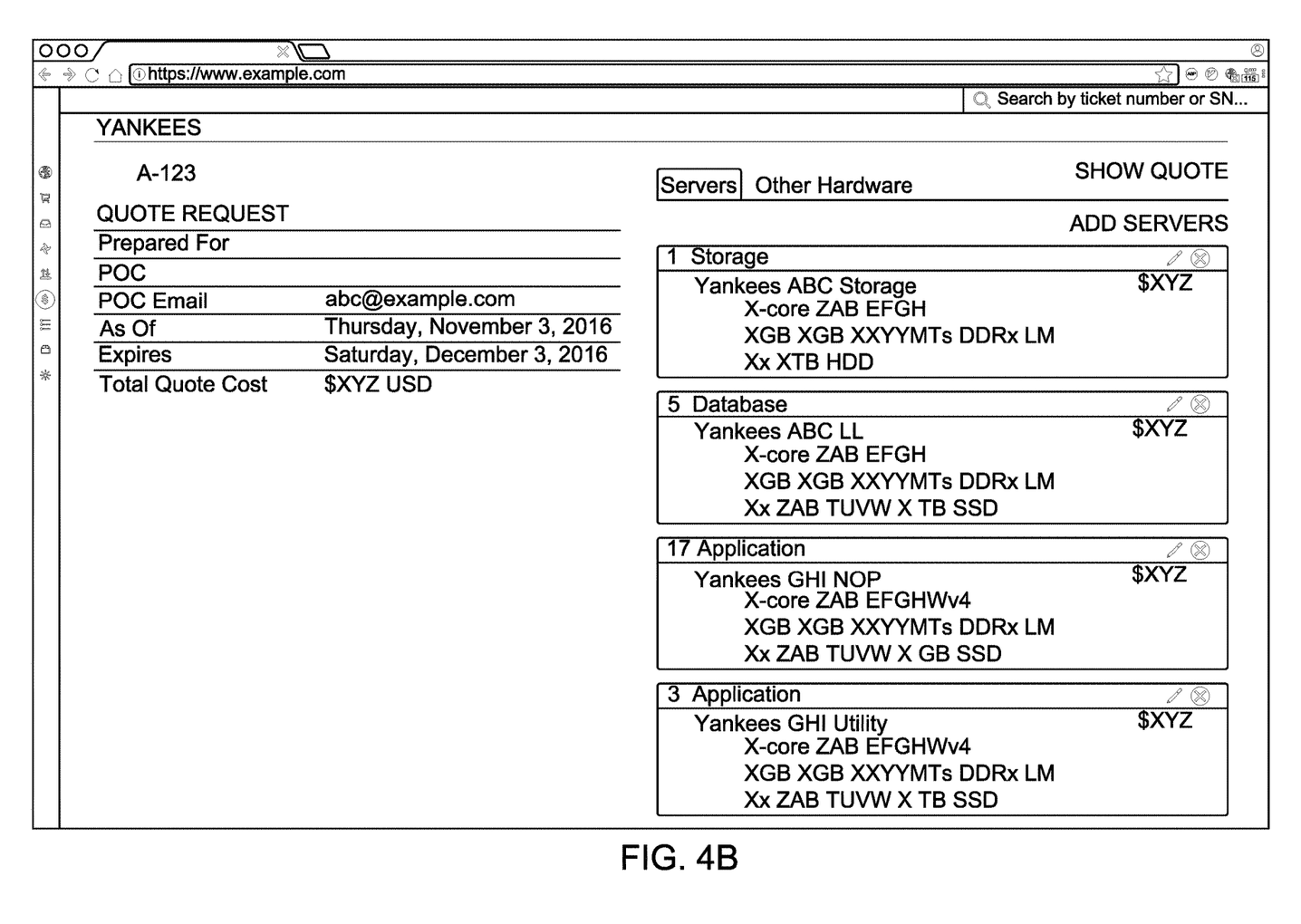
FIG. 4B illustrates an example quote request, according to some embodiments.
Figure 4C:
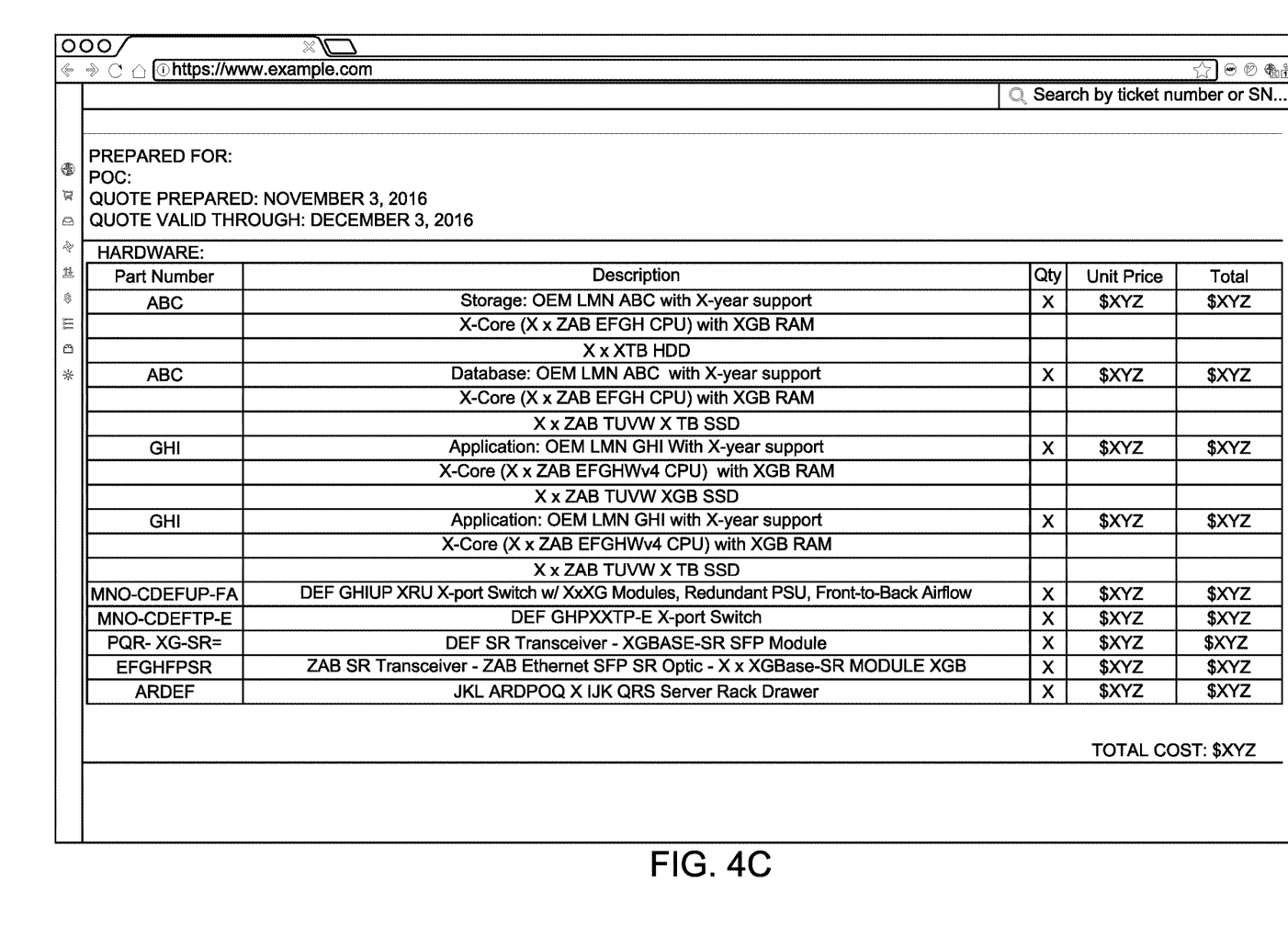
FIG. 4C illustrates an example hardware configuration quote, according to some embodiments.
Figure 4D:
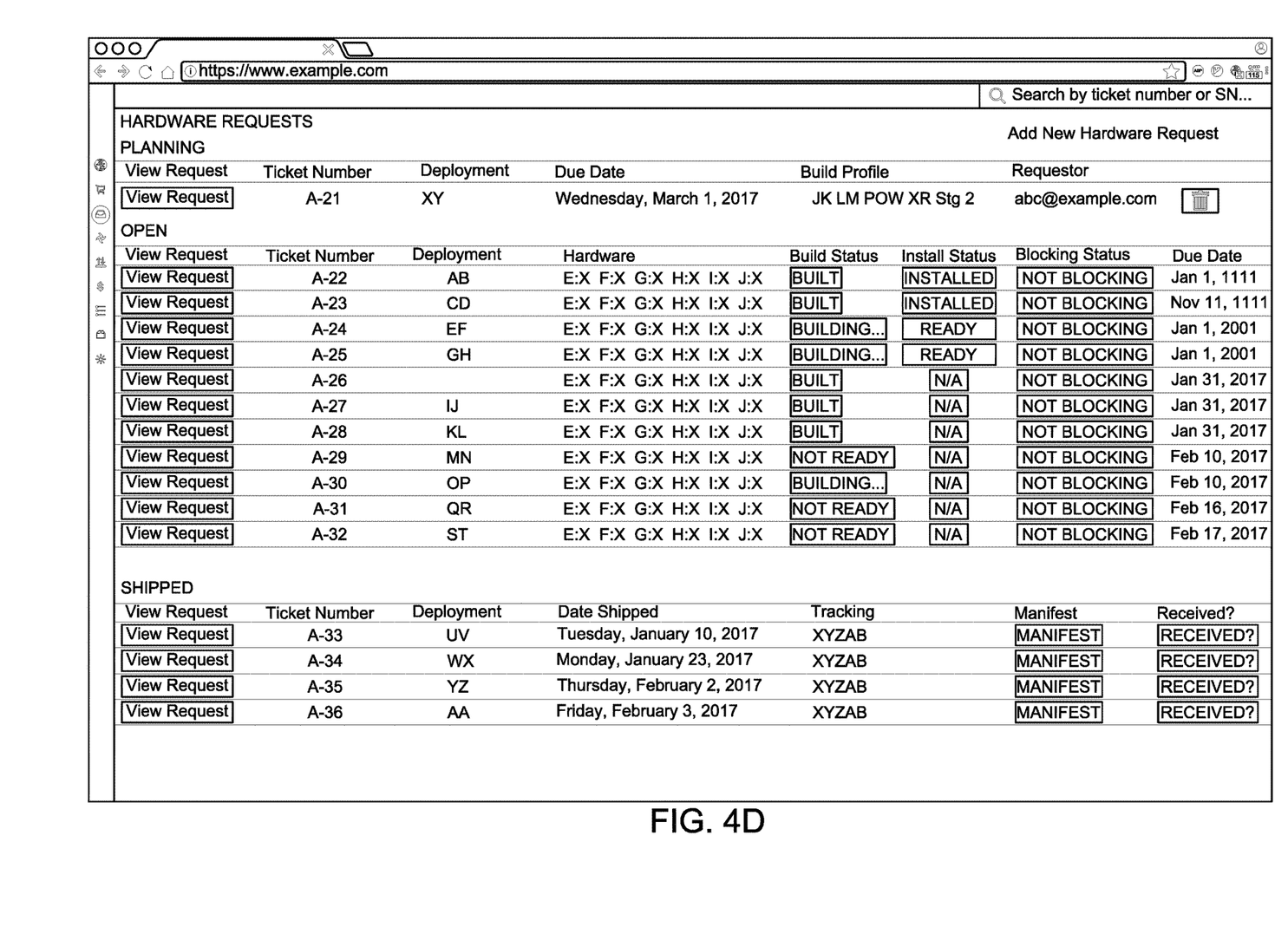
FIG. 4D illustrates example hardware requests, according to some embodiments.

FIGS. 4A-4D illustrate example user interfaces which may be used in conjunction with the subject technology, according to some embodiments. FIG. 4A illustrates an example of purchase orders for computing machines, according to some embodiments. FIG. 4B illustrates an example quote request, according to some embodiments. FIG. 4C illustrates an example hardware configuration quote, according to some embodiments. FIG. 4D illustrates example hardware requests, according to some embodiments.

Figure 5:
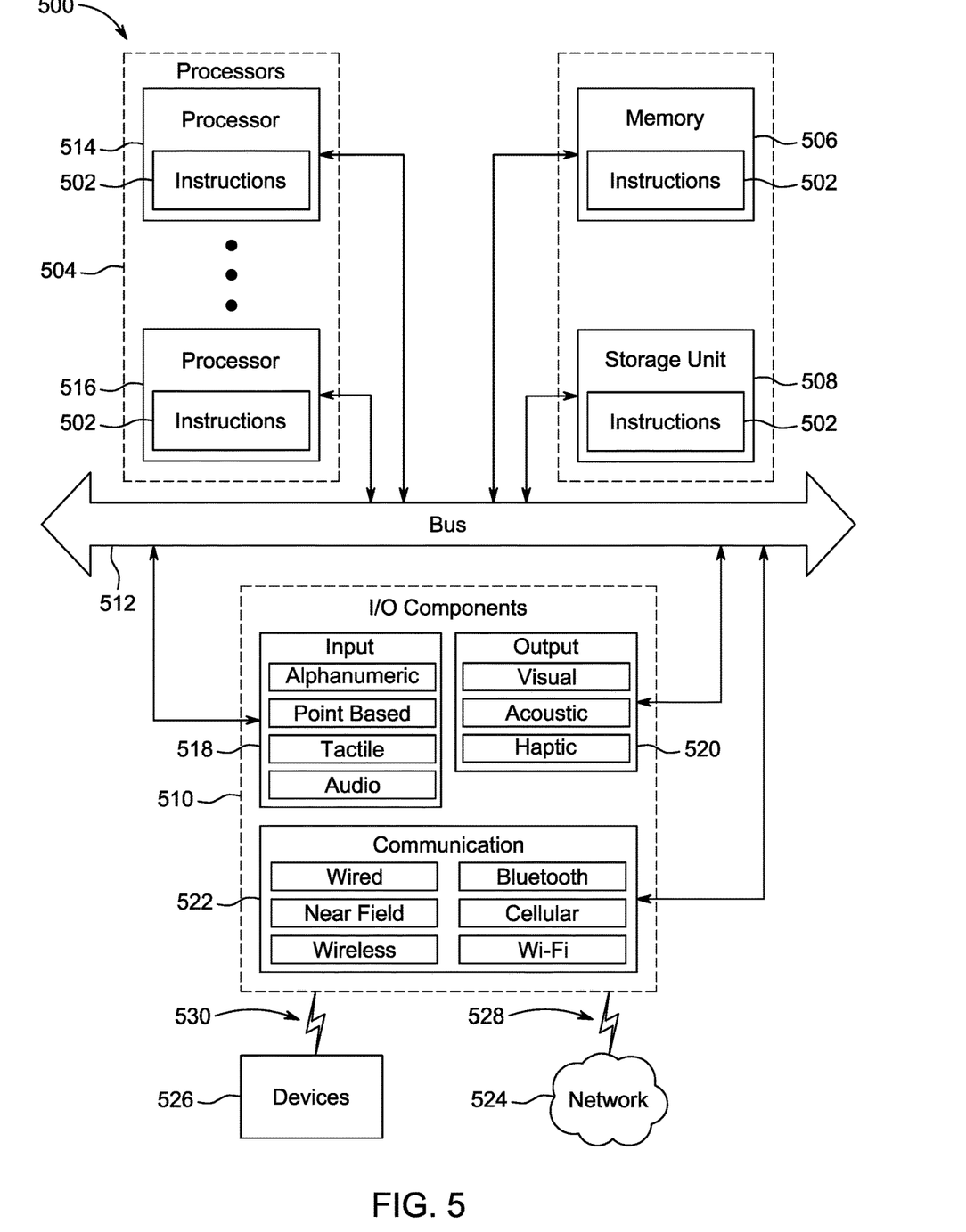
FIG. 5 is a block diagram illustrating components of a machine able to read and execute instructions from a machine-readable medium that cause the machine to perform any one or more of the methodologies discussed herein, according to some embodiments.

FIG. 5 is a block diagram illustrating components of a machine 500, according to some example embodiments, able to read instructions from a machine-readable medium (e.g., a machine-readable storage medium) and perform any one or more of the methodologies discussed herein. The machine 500 may correspond to one or more of the administrator client device 110, the application client device 120, the administrator server 130, and the application server 140. Specifically, FIG. 5 shows a diagrammatic representation of the machine 500 in the example form of a system, within which instructions 502 (e.g., software, a program, an application, an applet, an app, a driver, or other executable code) for causing the machine 500 to perform any one or more of the methodologies discussed herein may be executed. For example, the instructions 502 include executable code that causes the machine 500 to execute the methods 200 or 300. In this way, these instructions transform the general, non-programmed machine into a particular machine programmed to carry out the described and illustrated functions in the manner described herein. The machine 500 may operate as a standalone device or may be coupled (e.g., networked) to other machines.

By way of non-limiting example, the machine 500 may comprise or correspond to a television, a computer (e.g., a server computer, a client computer, a personal computer (PC), a tablet computer, a laptop computer, or a netbook), a set-top box (STB), a personal digital assistant (PDA), an entertainment media system (e.g., an audio/video receiver), a cellular telephone, a smart phone, a mobile device, a wearable device (e.g., a smart watch), a portable media player, or any machine capable of outputting audio signals and capable of executing the instructions 502, sequentially or otherwise, that specify actions to be taken by machine 500. Further, while only a single machine 500 is illustrated, the term "machine" shall also be taken to include a collection of machines 500 that individually or jointly execute the instructions 502 to perform any one or more of the methodologies discussed herein.

The machine 500 may include processors 504, memory 506, storage unit 508 and I/O components 510, which may be configured to communicate with each other such as via a bus 512. In an example embodiment, the processors 504 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 514 and processor 516 that may execute instructions 502. The term "processor" is intended to include multi-core processors that may comprise two or more independent processors (sometimes referred to as "cores") that may execute instructions contemporaneously. Although FIG. 5 shows multiple processors, the machine 500 may include a single processor with a single core, a single processor with multiple cores (e.g., a multi-core process), multiple processors with a single core, multiple processors with multiples cores, or any combination thereof.

The memory 506 (e.g., a main memory or other memory storage) and the storage unit 508 are both accessible to the processors 504 such as via the bus 512. The memory 506 and the storage unit 508 store the instructions 502 embodying any one or more of the methodologies or functions described herein. The instructions 502 may also reside, completely or partially, within the memory 506, within the storage unit 508, within at least one of the processors 504 (e.g., within the processor's cache memory), or any suitable combination thereof, during execution thereof by the machine 500. Accordingly, the memory 506, the storage unit 508, and the memory of processors 504 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), or any suitable combination thereof. The term "machine-readable medium" should be taken to include a single medium or multiple media (e.g., a centralized or distributed database, or associated caches and servers) able to store instructions 502. The term "machine-readable medium" shall also be taken to include any medium, or combination of multiple media, that is capable of storing instructions (e.g., instructions 502) for execution by a machine (e.g., machine 500), such that the instructions, when executed by one or more processors of the machine 500 (e.g., processors 504), cause the machine 500 to perform any one or more of the methodologies described herein (e.g., methods 200 and 500). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 510 may include a wide variety of components to receive input, provide output, produce output, transmit information, exchange information, capture measurements, and so on. The specific I/O components 510 that are included in a particular machine will depend on the type of machine. For example, portable machines such as mobile phones will likely include a touch input device or other such input mechanisms, while a headless server machine will likely not include such a touch input device. It will be appreciated that the I/O components 510 may include many other components that are not specifically shown in FIG. 5. The I/O components 510 are grouped according to functionality merely for simplifying the following discussion and the grouping is in no way limiting. In various example embodiments, the I/O components 510 may include input components 518 and output components 520. The input components 518 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components, and the like. The output components 520 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 510 may include communication components 522 operable to couple the machine 500 to a network 524 or devices 526 via coupling 528 and coupling 530, respectively. For example, the communication components 522 may include a network interface component or other suitable device to interface with the network 524. In further examples, communication components 522 may include wired communication components, wireless communication components, cellular communication components, near field communication (NFC) components, Bluetooth® components (e.g., Bluetooth® Low Energy), WiFi® components, and other communication components to provide communication via other modalities. The devices 526 may be another machine or any of a wide variety of peripheral devices (e.g., a peripheral device coupled via a Universal Serial Bus (USB)).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Language

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A system comprising:
   one or more processors; and
   a memory comprising instructions which, when executed by the one or more processors, cause the one or more processors to perform operations comprising:
      receiving a first request specifying a software configuration and a hardware configuration for a computing machine;
      identifying, out of a plurality of computing machines available for deployment, a specific computing machine meeting the hardware configuration, wherein a first data structure identifies the plurality of computing machines available for deployment, wherein a second data structure identifies a plurality of deployed computing machines, wherein the first data structure is different from the second data structure, wherein the first data structure is a table or a hash table, and wherein the second data structure is a list, an array or a matrix;

configuring, remotely over a network, the specific computing machine based on the software configuration;

adjusting the first data structure and the second data structure based on the specific computing machine being deployed;

providing an output indicating that the specific computing machine is configured according to the first request;

providing, in response to a second request for a listing of the plurality of computing machines available for deployment, a representation of the first data structure; and providing, in response to a third request for a listing of the deployed computing machines, a representation of the second data structure.

2. The system of claim 1, wherein the software configuration indicates an operating system or a software program for the computing machine.

3. The system of claim 1, wherein the hardware configuration indicates one or more of a processor requirement, a memory requirement, and a network interface requirement for the computing machine.

4. The system of claim 1, wherein configuring the specific computing machine based on the software configuration comprises transmitting the software configuration to the specific computing machine via a network.

5. The system of claim 1, the operations further comprising:

receiving a second request for a listing of the plurality of computing machines available for deployment; and providing, in response to the second request, the listing of the plurality of computing machines available for deployment, the listing identifying hardware and software available at each of the plurality of computing machines.

6. The system of claim 1, the operations further comprising:

receiving a second request for the list of deployed computing machines; and providing, in response to the second request, the list of deployed computing machines, the list identifying hardware and software available at each of the deployed computing machines.

7. A non-transitory computer-readable medium comprising instructions which, when executed by one or more processors of a computer, cause the one or more processors to perform operations comprising:

receiving a first request specifying a software configuration and a hardware configuration for a computing machine;

identifying, out of a plurality of computing machines available for deployment, a specific computing machine meeting the hardware configuration, wherein a first data structure identifies the plurality of computing machines available for deployment, wherein a second data structure identifies a plurality of deployed computing machines, wherein the first data structure is different from the second data structure, wherein the first data structure is a table or a hash table, and wherein the second data structure is a list, an array or a matrix;

configuring, remotely over a network, the specific computing machine based on the software configuration;

adjusting the first data structure and the second data structure based on the specific computing machine being deployed;

providing an output indicating that the specific computing machine is configured according to the first request;

providing, in response to a second request for a listing of the plurality of computing machines available for deployment, a representation of the first data structure; and providing, in response to a third request for a listing of the deployed computing machines, a representation of the second data structure.

8. The computer-readable medium of claim 7, wherein the software configuration indicates an operating system or a software program for the computing machine.

9. The computer-readable medium of claim 7, wherein the hardware configuration indicates one or more of a processor requirement, a memory requirement, and a network interface requirement for the computing machine.

10. The computer-readable medium of claim 7, wherein configuring the specific computing machine based on the software configuration comprises transmitting the software configuration to the specific computing machine via a network.

11. The computer-readable medium of claim 7, the operations further comprising:

receiving a second request for a listing of the plurality of computing machines available for deployment; and providing, in response to the second request, the listing of the plurality of computing machines available for deployment, the listing identifying hardware and software available at each of the plurality of computing machines.

12. The computer-readable medium of claim 7, the operations further comprising:

receiving a second request for the list of deployed computing machines; and providing, in response to the second request, the list of deployed computing machines, the list identifying hardware and software available at each of the deployed computing machines.

13. A method comprising:

receiving a first request specifying a software configuration and a hardware configuration for a computing machine;

identifying, out of a plurality of computing machines available for deployment, a specific computing machine meeting the hardware configuration, wherein a first data structure identifies the plurality of computing machines available for deployment, wherein a second data structure identifies a plurality of deployed computing machines, wherein the first data structure is different from the second data structure, wherein the first data structure is a table or a hash table, and wherein the second data structure is a list, an array or a matrix;

configuring, remotely over a network, the specific computing machine based on the software configuration;

adjusting the first data structure and the second data structure based on the specific computing machine being deployed;

providing an output indicating that the specific computing machine is configured according to the first request;

providing, in response to a second request for a listing of the plurality of computing machines available for deployment, a representation of the first data structure; and providing, in response to a third request for a listing of the deployed computing machines, a representation of the second data structure.

14. The method of claim 13, wherein the software configuration indicates an operating system or a software program for the computing machine.

15. The method of claim 13, wherein the hardware configuration indicates one or more of a processor requirement, a memory requirement, and a network interface requirement for the computing machine.

16. The method of claim 13, wherein configuring the specific computing machine based on the software configuration comprises transmitting the software configuration to the specific computing machine via a network.

17. The method of claim 13, further comprising:
receiving a second request for a listing of the plurality of computing machines available for deployment; and
providing, in response to the second request, the listing of the plurality of computing machines available for deployment, the listing identifying hardware and software available at each of the plurality of computing machines.

* * * * *